Jan. 3, 1939.  E. N. COLE ET AL  2,142,178
VIBRATION DAMPER
Filed June 13, 1936   2 Sheets-Sheet 1
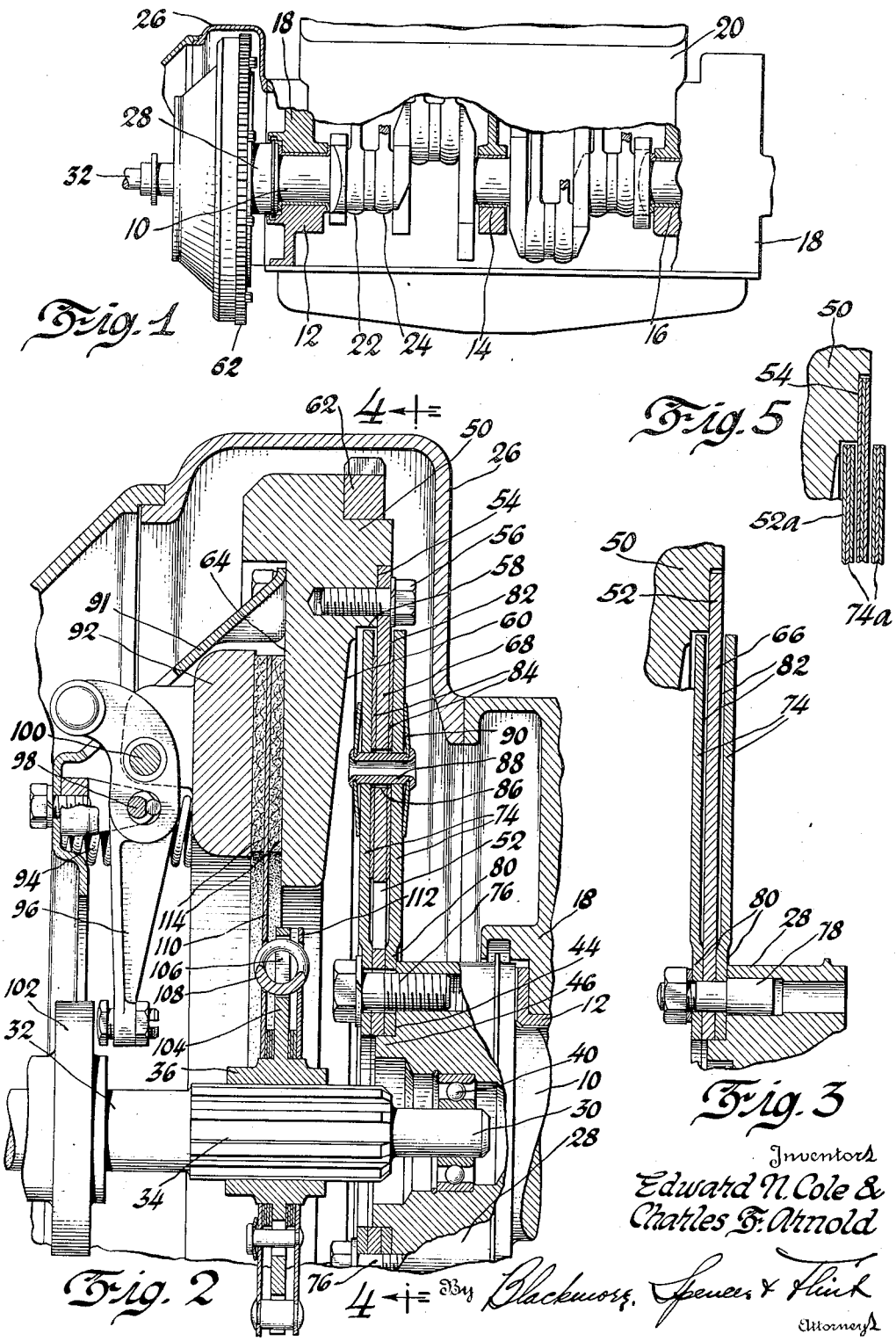
Inventors
Edward N. Cole &
Charles F. Arnold
By Blackmore, Spencer & Flint
Attorneys

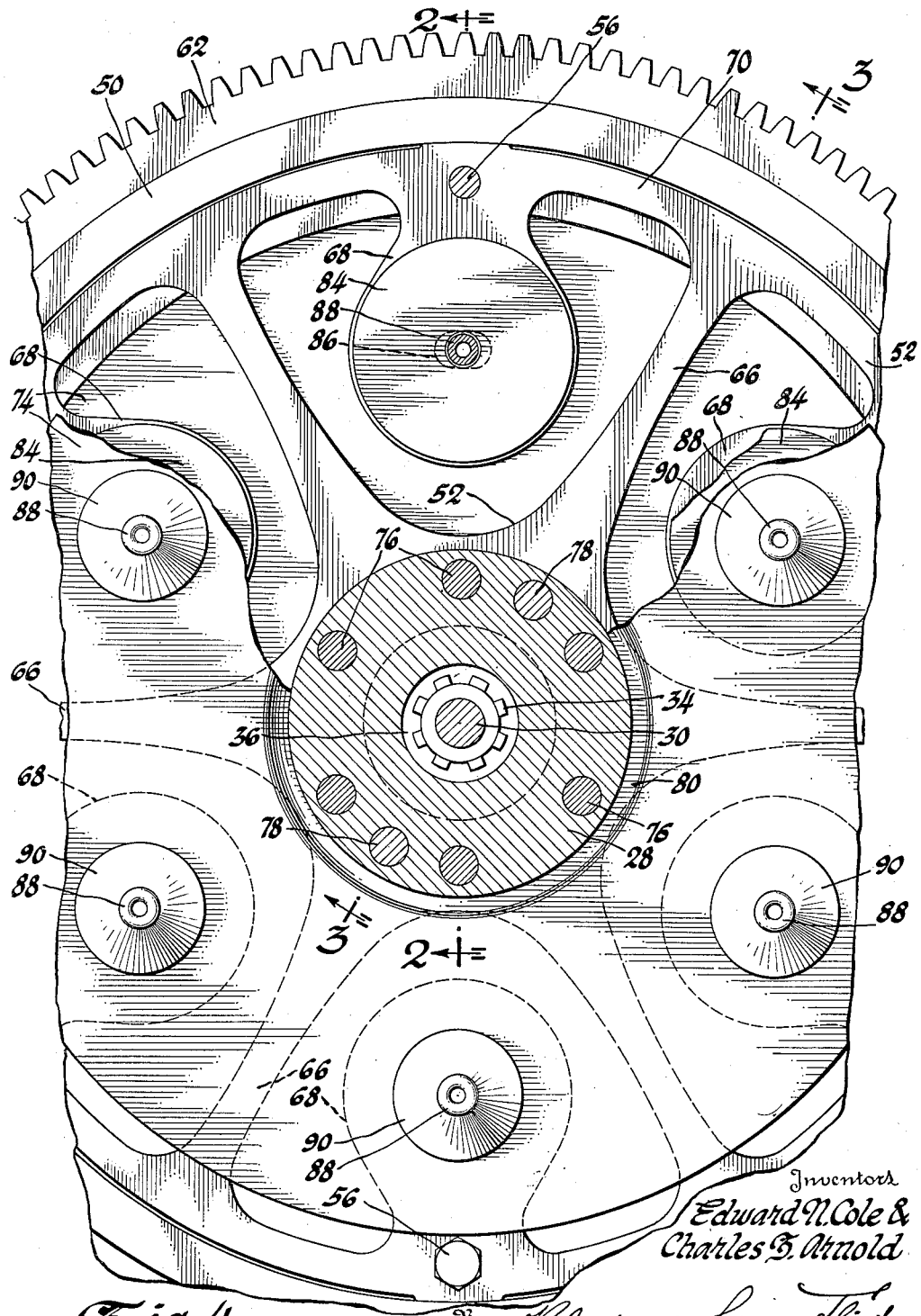

Patented Jan. 3, 1939

2,142,178

UNITED STATES PATENT OFFICE 2,142,178

VIBRATION DAMPER

Edward N. Cole and Charles F. Arnold, Detroit, Mich., assignors to General Motors Corporation, Detroit, Mich., a corporation of Delaware Application June 13, 1936, Serial No. 85,039

13 Claims. (Cl. 74—574)

This invention relates to means for eliminating or minimizing the amplitude of shaft vibrations. It is particularly adapted to counteract, as by damping, vibrations of an engine driven crankshaft.

The objects are to minimize transverse vibrations of a prime mover or other primary shaft; to minimize torsional vibrations thereof; to minimize both transverse and torsional vibrations by a single instrumentality, and to prevent the transmission of vibrations from one shaft to another coupled thereto.

The invention consists in an inertia body such as a flywheel mounted on a shaft by a driving plate that yieldingly resists relative angular movement of the inertia body and shaft with respect to the shaft axis, and also bending and other movements of the shaft with respect to the plane of rotation of the inertia body.

In the accompanying drawings in which like reference characters indicate like parts throughout the several views, Figure 1 is a fragmentary view partly in section of an internal combustion engine including the flywheel, engine clutch, and the adjacent end of the clutch shaft;

Figure 2 is an axial section taken along line 2—2 of Figure 4 through the flywheel and clutch, showing also the adjoining ends of the crank and clutch shafts.

Figure 3 is a section on line 3—3 of Figure 4,

Figure 4 is a section on line 4—4 of Figure 2, and

Figure 5 is a sectional view showing a minor modification.

Figure 1 of the drawings shows the invention associated with the crankshaft of an eight-cylinder V-type automobile engine and the al'ned clutch transmission shaft; Figure 2 shows it embodied in the flywheel and clutch, which occupy the usual position at one end of the crankshaft, and the adjoining end of the clutch transmission shaft. The flywheel constitutes an element of the friction clutch by which the eng'ne shaft may be coupled to the transmission mechanism.

In Figure 1 numeral 10 indicates a primary shaft consisting of a counter-balanced four-throw crankshaft for a V-eight engine. The shaft is journalled in bearings 12, 14 and 16 in the engine frame 18. One cylinder block is indicated at 20. The connecting rods 22 and 24 are shown connected to the several cranks in pairs as is usual in V-type engines. A housing 26 for inclosing the flywheel and clutch is secured to the frame.

The rear end of shaft 10 is enlarged as at 28. The enlarged end is drilled and counterbored to receive the reduced forward end 30 of the clutch transmission shaft 32, which is ribbed or splined at 34 to receive the hub member 36 of a clutch plate. The reduced end 30 of the clutch transm'ssion shaft is mounted in an anti-friction bearing 40 within the drilled and counterbored end of the crankshaft.

Said enlarged rear end 28 of the crankshaft 10 is formed with a circular external rabbet 44 which constitutes a seat for the web, driving plate or other part of the flywheel whereby the heavy rim is connected to the crankshaft. Rabbet 44 provides a cylindrical shoulder 46 and a plane annular surface substantially perpendicular to the axis of shaft 10.

The flywheel comprises a solid and relatively heavy metallic annular rim 50 having a vibration suppressing connection with the crankshaft. The rim is shown mounted on an elastic driving plate 52 the outer edge of which fits into a circular rabbet 54 formed in the front face of the solid rim. Bolts 56 secure the rim to the driving plate as shown in Figure 2. From the rabbet 54 the rear face of rim 50 is shouldered rearward as at 58, and thence slopes downward and rearward, in the form of a shallow internal conoidal surface 60, to the central opening of the rim. Ample clearance is thus provided between rim 50, the driving plate, and the damper plates to be described, for avoiding interference during transverse or bending vibrations of the shaft. Numeral 62 indicates the usual gear ring on the flywheel rim whereby the starter gear rotates the flywheel and crankshaft to start the engine. The rearward face of the rim at 64 constitutes one of the friction surfaces of the engine clutch.

The driving plate 52 consists of a circular disk, as of elastic sheet steel of suitable thickness, with portions cut away as illustrated in Figure 4 to form a series of elastic spokes 66, and a series of elastic, tongue-like friction pads 68 equal in number to the number of spokes and alternating with them. The spokes 66 are elastic in a plane normal to the axis of the primary shaft as well as in directions transverse of said plane, that is, sa'd spokes are yieldable angularly about the axis of shaft 10 and are also yieldable in a direction lengthwise of the axis. The friction pads 68 preferably extend radially inward from the outer-ring-like part 70 of the driving plate so that they are free to flex in an axial direction with reference to the crankshaft except as resisted by their elasticity.

Driving plate 52 is clamped between two damping plates 74 of disk form to the enlarged end 28 of crankshaft 10 as shown. Both driving plate 52 and damping plates 74 are drilled with a series of holes, preferably six in number, as shown, to receive bolts 76 by which the flywheel assembly is secured to the crankshaft within the seat 44. Two other holes diametrically opposite receive dowels 78 for initially centering the assembly. The rearward damping plate 74 is disposed within the space surrounded by the cylindrical shoulder 58 in rim 50 with slight radial clearance for a purpose to be explained.

The damping plates 74 have, as shown in Figures 2 and 3, an annular central part 80 slightly offset from the remainder, as by die pressing or embossing, so that when disposed as illustrated in said figures the driving plate and the damping plates are clamped with their inner zones—the areas adjoining the central openings that receive the cylindrical shoulder 46 on the rear end of the crankshaft—in close contact. This disposition leaves a thin clearance space 82 between each damping plate and the driving plate. This space 82 is occupied by friction washers 84 between the damping plates and the tongue-like friction pads 68. At all other areas the said space is unoccupied by solid material and there is no frictional resistance between damping plates and spokes or other parts of the driving plate. The pads 68 are of circular outline except for the neck parts that connect the pads with the ring-like outer part 70 of the driving plate. Each pad has a hole 86 through its center. The damping plates 74 have holes axially registering with the holes 86 in the pads and each washer 84 is centrally perforated. For a purpose to be stated presently the holes 86 are very slightly wider, measured radially of the driving plate than the perforations in damping plates and washers but are of greater dimensions measured along a circle struck from the axis of the driving plate, as indicated in Figures 2 and 4. Rivets 88 fill the holes in damping plates and washers and pass through the holes 86 in the driving plate leaving clearance space around each rivet between it and the driving plate to allow for the necessary relative movements between driving and damping plates. Spring washers 90 are held by the rivets 88 so that the washers exert an elastic pressure against the plates 54 tending to force them into frictional contact with the washers 84 and the latter into frictional contact with driving plate 52. The described connection allows relative torsional movement of the shaft with respect to rim and driving plate, and relative axial and bending movements by flexing of the pads, spokes and damping plates.

Either the driving plate, or the damping plates, one or both, may be built up of thin elastic layers if desired, as indicated at 52a and 74a in Fig. 5, thereby securing the advantages of inherent damping within the plates, and to vary flexibility, elasticity and strength by varying the number of laminations in the plate.

The clutch parts mounted on the engine shaft and the clutch operating means of themselves are of the type illustrated in patent to Wemp No. 2,021,973. It will suffice to state that numeral 91 indicates the so-called clutch cover plate, bolted to the flywheel; 92 the clutch pressure plate, rotating with the flywheel and cover plate; 94 the coil springs reacting between cover plate and clutch pressure plate tending always to set the clutch; 96 the clutch releasing levers fulcrumed at 98 on brackets bolted to the cover plate and pivoted at 100 between bifurcated bosses on the clutch pressure ring, and 102 the clutch throwout bearing.

Hub member 36, that is splined to the clutch shaft 32 as described, has a flange 104 provided with spring seats 106 for receiving coil springs 108. The clutch plate 110 disposed at one side of the flange 104 and a parallel ring-like plate 112 disposed at the other side of the flange and riveted to the clutch plate 110 are each provided with spring seats corresponding to the seats 106 in flange 104, whereby the springs engage the opposite ends of the spring seats in both flange 104 and plates 110 and 112. Clutch plate 110 carries the usual friction material 114 between the surfaces of the flywheel rim and clutch pressure plate. This is a known clutch construction, which is well adapted to cooperate with the novel vibration suppressing flywheel described.

By reason of the elastic flexibility of the spokes 66 of the flywheel driving plate 52 in a direction axially of the crankshaft axis, transverse vibrations of the crankshaft normally imparted to the flywheel web or driving plate will be damped by the coaction of the damper plates 74 and washers 84 with the friction pads 68.

Inasmuch as the spokes 66 of the flywheel driving plate are elastically yieldable, torsionally as well as axially, torsional vibrations of the crankshaft will be minimized by reason of the damped yielding of the flywheel driving plate 52.

Vibrations of the crankshaft may be transmitted either through the main bearings and crankcase to the frame or through the flywheel and clutch to the gearing and propeller shaft. The interposition of the damping means in the flywheel not only minimizes the vibration of the crankshaft and crankcase, but prevents vibration from reaching the transmission line.

The described arrangement of rearward damping plate 74 within the space formed in rim 50 by shoulder 58, and with small radial clearance between said shoulder and the periphery of the plate, constitutes a safety factor in the described construction, for the reason that, in the event of breakage of the driving plate 52, the said inner damping plate 74 will act as a pilot to center and hold the flywheel in position. The described relation of the damping plates 74, rivets 88, and driving plate 52, by reason of the slight radial clearance of the rivets 88 in the circumferentially elongated holes 86 in the driving plate provides an additional factor of safety in the event of breakage of one or more of the spokes 66 of the driving plate. The small radial clearance between rearward plate 74 and shoulder 58 and the substantially equal radial clearance between rivets 88 and wall of holes 86 prevent substantial displacement of the flywheel in case of breakage in the driving plate.

Although we have described and shown one specific form of the invention which is the best now known to us, our invention is not limited to that particular embodiment, since the essential elements thereof may be included in other specific mechanisms.

We claim:

1. The combination of an engine crankshaft subject to vibrations, an inertia body comprising a relatively heavy annular rim, a flexible driving plate having its outer edge fast to said rim and its central portion fixedly secured to said crankshaft, said driving plate being capable of bending axially between its outer edge and center portion in response to transverse vibrations of the crankshaft, and damping means fixed to the crankshaft and bearing against the faces of the driving plate.

2. The combination of an engine crankshaft subject to vibrations, an inertia body comprising a relatively heavy annular rim, a driving plate having its outer edge fast to said rim and its central portion fixedly secured to said crankshaft, said driving plate comprising radial spokes and friction pads disposed between the spokes, and damping means fixed to the crankshaft and bearing against the pads.

3. The combination of an engine crankshaft subject to vibrations, an inertia body comprising a relatively heavy annular rim, a flexible elastic driving plate having its outer edge fast to said rim and its central portion fixedly secured to said crankshaft, said driving plate being capable of bending in the direction of the crankshaft axis between its outer edge and center portion in response to transverse vibrations of the crankshaft, and damping means fixed to the crankshaft and bearing against the faces of the driving plate.

4. The combination of an engine crankshaft subject to vibrations, an inertia body comprising a relatively heavy annular rim, a driving plate having its outer edge fast to said rim and its central portion fixedly secured to said crankshaft, said driving plate having radial spokes and friction pads extending radially inward between the spokes, damping plates secured to the shaft on opposite sides of the driving plate and in frictional contact with the pads.

5. The combination of an engine crankshaft subject to vibrations, an inertia body comprising a relatively heavy annular rim, a driving plate having its outer edge fast to said rim and its central portion fixedly secured to said crankshaft, said driving plate having radial spokes and frictional pads disposed between the spokes; damping plates secured to the shaft on opposite sides of the driving plate, friction washers disposed between the pads and the damping plates, and means for holding the pads, washers and damping plates in frictional contact.

6. The combination of an engine crankshaft subject to torsional and transverse vibrations, an inertia body comprising a relatively heavy annular rim, a driving plate having its outer edge fast to said rim and its central portion fixedly secured to said crankshaft, said driving plate having a portion between rim and crankshaft that is flexible both torsionally and axially and thereby yieldable in response to torsional and transverse vibrations respectively of said crankshaft, and damping means fixed to the crankshaft and bearing against the faces of the driving plate.

7. The combination of an engine crankshaft subject to torsional and transverse vibrations, an inertia body comprising a relatively heavy annular rim, a driving plate having its outer edge fast to said rim and its central portion fixedly secured to said crankshaft, said driving plate having radial flexible elastic spokes, and friction pads extending radially inward between the spokes, and damping means secured to the shaft and bearing frictionally on said pads.

8. The combination of an engine crankshaft subject to torsional and transverse vibrations, an inertia body comprising a relatively heavy annular rim, a driving plate having its outer edge fast to said rim and its central portion fixedly secured to said crankshaft, said driving plate having radially disposed elastic spokes and pads between the spokes, damping plates secured to the shaft on opposite sides of the driving plate, and frictional material disposed between the damping plates and the pads.

9. The combination of an engine crankshaft subject to torsional and transverse vibrations, an inertia body comprising a relatively heavy annular rim, a driving plate having its outer edge fast to said rim and its central portion fixedly secured to said crankshaft, said driving plate having elastic, yieldable spokes, and pads between the spokes, damping plates secured to the shaft on opposite sides of the driving plate, friction washers between the pads and damping plates, and means for holding the pads, washers and damping plates in frictional contact while permitting limited relative torsional movement between shaft and rim.

10. The combination of an engine crankshaft subject to torsional and transverse vibrations, an inertia body comprising a relatively heavy annular rim, a driving plate having its outer edge fast to said rim and its central portion fixedly secured to said crankshaft, said driving plate having elastic spokes and alternating friction pads, means rigidly mounted on the shaft having a lost-motion connection with the pads to allow relative torsional movement, and elastic means operative to clamp the pads to said means mounted on the shaft.

11. The combination of a shaft subject to vibration, a flywheel comprising a relatively heavy rim, means including a flexible metallic driving plate connecting the rim to the shaft, said rim having an internal shoulder formed therein; a disc fixed to the shaft coaxial with the rim and disposed within the space surrounded by said shoulder, said disc being unconnected with the rim and having an external diameter slightly smaller than the internal diameter of said shoulder.

12. A shaft having a flywheel mounted thereon, said flywheel comprising a relatively heavy rim, a flexible driving plate connected to the rim, damping plates secured to the shaft, said driving plate having holes elongated in a circle concentric with the axis of the driving plate, and pins secured to the damping plates and passing through the elongated holes in the driving plate with slight radial clearance.

13. The combination of a shaft, a flywheel thereon comprising a heavy rim and a flexible driving plate having its central portion fixed to the shaft and its outer edge fast to the rim, and laminated damping plates secured to the shaft and bearing on opposite sides of the driving plate.

EDWARD N. COLE.
CHARLES F. ARNOLD.